(12) United States Patent
Tang et al.

(10) Patent No.: US 11,385,396 B2
(45) Date of Patent: Jul. 12, 2022

(54) COLLIMATING DEVICE, OPTICAL FILM, BACKLIGHT MODULE AND DISPLAY APPARATUS

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Hai Tang, Beijing (CN); Liang Gao, Beijing (CN); Bing Zhang, Beijing (CN); Xiaolin Geng, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/264,101

(22) PCT Filed: May 9, 2020

(86) PCT No.: PCT/CN2020/089372
§ 371 (c)(1),
(2) Date: Jan. 28, 2021

(87) PCT Pub. No.: WO2020/228632
PCT Pub. Date: Nov. 19, 2020

(65) Prior Publication Data
US 2021/0302642 A1   Sep. 30, 2021

(30) Foreign Application Priority Data
May 13, 2019 (CN) .......................... 201910393419.0

(51) Int. Cl.
*F21V 8/00* (2006.01)
*G02F 1/1335* (2006.01)
*G02F 1/13357* (2006.01)

(52) U.S. Cl.
CPC ....... *G02B 6/005* (2013.01); *G02F 1/133524* (2013.01); *G02F 1/133605* (2013.01); *G02F 1/133607* (2021.01)

(58) Field of Classification Search
CPC . G02B 6/005; G02B 6/0053; G02F 1/133524; G02F 1/133605; G02F 1/133607; F21V 5/04
See application file for complete search history.

(56) References Cited

U.S. PATENT DOCUMENTS 6,129,439 A * 10/2000 Hou .......................... F21V 5/02
                                                                362/626
6,163,351 A * 12/2000 Nakayama ........... G02B 6/0053
                                                                349/115
(Continued)

FOREIGN PATENT DOCUMENTS

CN       101067663       11/2007
CN       201876559        6/2011
(Continued)

OTHER PUBLICATIONS

International Search Report (w/ English Translation) for corresponding PCT Application No. PCT/CN2020/089372, dated Jul. 30. 2020, 5 pages.

(Continued)

*Primary Examiner* — Erin Kryukova
(74) *Attorney, Agent, or Firm* — Dority & Manning, P.A.

(57) ABSTRACT

A collimating device includes at least one microstructure portion. Each microstructure portion includes a bottom surface; a side surface connected to the bottom surface, an angle between the side surface and the bottom surface being an obtuse angle; and a top surface opposite to the bottom surface and connected to the side surface, the top surface being a convex free-form surface.

19 Claims, 12 Drawing Sheets

(56) References Cited

U.S. PATENT DOCUMENTS

| | | | |
|---|---|---|---|
| 6,876,408 B2 | 4/2005 | Yamaguchi | |
| 8,061,857 B2 | 11/2011 | Liu et al. | |
| 2009/0268128 A1 | 10/2009 | Yamada | |
| 2010/0128233 A1 | 5/2010 | Liu et al. | |
| 2013/0294108 A1* | 11/2013 | Hu | G02B 6/0053 362/613 |
| 2018/0203299 A1* | 7/2018 | Wang | G02F 1/133606 |
| 2020/0019020 A1 | 1/2020 | Tang et al. | |
| 2020/0233225 A1 | 7/2020 | Tan et al. | |
| 2020/0233267 A1 | 7/2020 | Yu et al. | |

FOREIGN PATENT DOCUMENTS

| | | | |
|---|---|---|---|
| CN | 202484729 | 10/2012 | |
| CN | 105737099 | 7/2016 | |
| CN | 105842774 | 8/2016 | |
| CN | 105842774 A * | 8/2016 | |
| CN | 106526976 | 3/2017 | |
| CN | 107631209 | 1/2018 | |
| CN | 108845458 A * | 11/2018 | G02F 1/133603 |
| CN | 209638930 | 11/2019 | |

OTHER PUBLICATIONS

First Chinese Office Action (w/ English Translation) for corresponding Chinese Application No. 201910393419.0, 17 pages.
Suvplementary Search for Chinese Patent Apolication No. 2019103934190.0, 2 pages.

* cited by examiner

COLLIMATING DEVICE, OPTICAL FILM, BACKLIGHT MODULE AND DISPLAY APPARATUS

CROSS-REFERENCE TO RELATED APPLICATIONS

This application is a national phase entry under 35 USC 371 of International Patent Application No. PCT/CN2020/089372 filed on May 9, 2020, which claims priority to Chinese Patent Application No. 201910393419.0, filed on May 13, 2019, which are incorporated herein by reference in their entirety.

TECHNICAL FIELD

Embodiments of the present disclosure relate to a collimating device, an optical film, a backlight module and a display apparatus.

BACKGROUND

With anti-peep function, high-dynamic range (HDR), low power consumption, and ultra-thin module structure, smart displays are a key technology trend in development of the display industry at present. Collimated light beams play an important role in smart display technology.

SUMMARY

In an aspect, a collimating device is provided. The collimating device includes at least one microstructure portion. Each microstructure portion includes: a bottom surface; a side surface connected to the bottom surface, an angle between the side surface and the bottom surface being an obtuse angle; and a top surface opposite to the bottom surface and connected to the side surface, the top surface being a convex free-form surface.

In some embodiments, the convex free-form surface satisfies following formula:

$$\Delta y = \frac{n_2 x - n_1 \sin\alpha \sqrt{x^2 + y^2}}{n_1 \cos\alpha \sqrt{x^2 + y^2} - n_2 y} \Delta x,$$

where (x, y) are coordinates of a point on a free-form curve, the free-form curve being an intersecting line of the convex free-form surface and a reference plane, and the reference plane being perpendicular to the bottom surface; $n_1$ is a refractive index of a medium that is in contact with the top surface; $n_2$ is a refractive index of the microstructure portion; $\alpha$ is an angle between light rays emitted from the convex free-form surface and a y-axis, the y-axis being perpendicular to the bottom surface; $\Delta x$ is a variation of two adjacent points on the free-form curve in an x-axis direction, and $\Delta y$ is a variation of the two adjacent points in a y-axis direction.

In some embodiments, the bottom surface of each microstructure portion is in a shape of a circle. The angle between the bottom surface and the side surface is $\beta$, and $\beta$ satisfies following formula;

$$\beta = 90° + \frac{\arcsin\left(\frac{n_3}{n_2}\sin\theta_{max}\right) - \arctan\left(\frac{R_1}{h}\right)}{2},$$

where $\theta_{max}$ is a maximum value of an incident angle $\theta$ of light rays incident onto the bottom surface; $R_1$ is a radius of the circle; h is a height of the microstructure portion in a direction perpendicular to the bottom surface; $n_2$ is the refractive index of the microstructure portion, and $n_3$ is a refractive index of a medium that is in contact with the bottom surface.

In some embodiments, each microstructure portion has an axis of rotational symmetry substantially that is substantially perpendicular to the bottom surface.

In some embodiments, the at least one microstructure portion includes two microstructure portions that intersect. Axes of rotational symmetry of the two microstructure portions are substantially parallel to each other.

In some embodiments, bottom surfaces of the two microstructure portions are located in a same plane, and the two microstructure portions are located at a same side of the plane.

In some embodiments, edges of the bottom surfaces of the two microstructure portions are tangent.

In some embodiments, the at least one microstructure portion includes two microstructure portions, and the collimating device further includes a filling portion provided between the two microstructure portions.

In another aspect, an optical film is provided. The optical film includes a substrate and a plurality of collimating devices as described in any one of the above embodiments that are arranged in an array in the substrate. Bottom surfaces of microstructure portions of the collimating devices are substantially parallel to a surface of the substrate proximate to the bottom surfaces of the microstructure portions of the collimating devices.

In some embodiments, the optical film is of a single-layer structure.

In yet another aspect, a backlight module is provided. The backlight module includes a light source, a light guide plate, and at least one collimating device as described in any one of the above embodiments or the optical film as described in any one of the above embodiments. A light incident surface of the light guide plate faces a light emitting surface of the light source. Bottom surface(s) of microstructure portion(s) of the collimating device(s) face a light exit surface of the light guide plate.

In some embodiments, the collimating device includes two microstructure portions that intersect, and a line connecting centers of bottom surfaces of the two microstructure portions is substantially parallel to the light incident surface of the light guide plate.

In some embodiments, a refractive index of the collimating device is substantially same as a refractive index of the light guide plate.

In some embodiments, the backlight module further includes glue layer(s) located between the collimating device(s) and the light exit surface of the light guide plate, A refractive index of the glue layer(s) is substantially same as the refractive index of the light guide plate.

In some embodiments, the backlight module further includes a reflective layer. The reflective layer is located on a surface of the light guide plate opposite to the light incident surface.

In yet another aspect, a display apparatus is provided. The display apparatus includes the backlight module as described in any one of the above embodiments, and a liquid crystal display panel. The liquid crystal display panel is located at a light exit side of the backlight module.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products involved in the embodiments of the present disclosure.

DETAILED DESCRIPTION

Figure 1A:
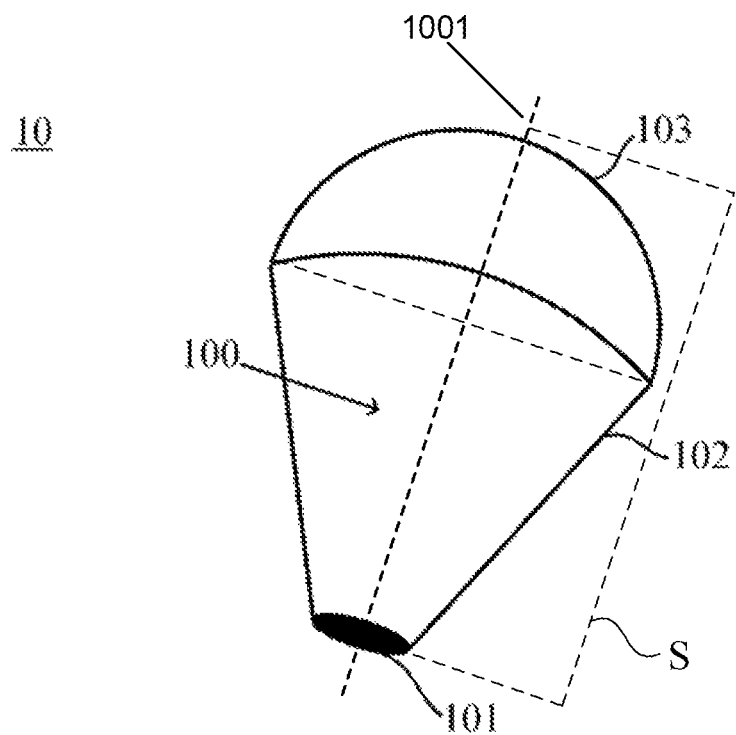
FIGS. 1A to 1C are three-dimensional structural diagrams of three collimating devices, according to some embodiments of the present disclosure.

Technical solutions in some embodiments of the present disclosure will be described clearly and completely below in combination with the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, the term "comprise" and other forms thereof such as the third-person singular form "comprises" and the present participle form "comprising" throughout the specification and the claims are construed as an open and inclusive meaning, i.e., "including, but not limited to". In the description of the specification, the terms such as "one embodiment", "some embodiments", "exemplary embodiments", "example", "specific example", or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

The terms such as "first" and "second" are used for descriptive purposes only, and are not to be construed as indicating or implying the relative importance or implicitly indicating the number of indicated technical features below. Thus, features defined as "first" or "second" may explicitly or implicitly include one or more of the features. In the description of the embodiments of the present disclosure, the term "a/the plurality of" means two or more unless otherwise specified.

In addition, the use of "based on" means openness and inclusiveness, since a process, step, calculation or other action that is "based on" one or more of the said conditions or values may, in practice, be based on additional conditions or exceed the said values.

As used herein, "about" or "approximately" includes the stated value and the average value that is within an acceptable deviation range of a specific value. The acceptable deviation range is determined by a person of ordinary skill in the art in view of measurement in question and errors associated with measurement of a specific quantity (i.e., limitations of a measurement system).

In the related art, methods for collimating light include providing holes in thin film(s), adding an absorption grating, etc. However, although these methods can achieve a certain near-collimation effect, a backlight brightness will be reduced by more than 40%, and a thickness of a module will also increase. This not only does not meet the design requirements of low power consumption, but also does not meet the development trend of ultra-thin module structure.

Figure 1B:
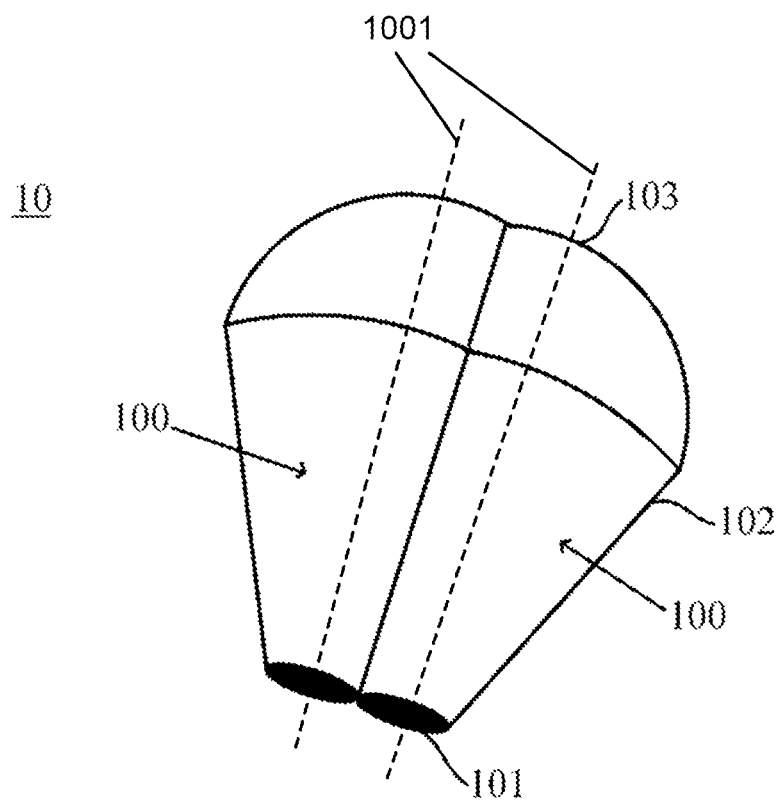
Figure 1C:
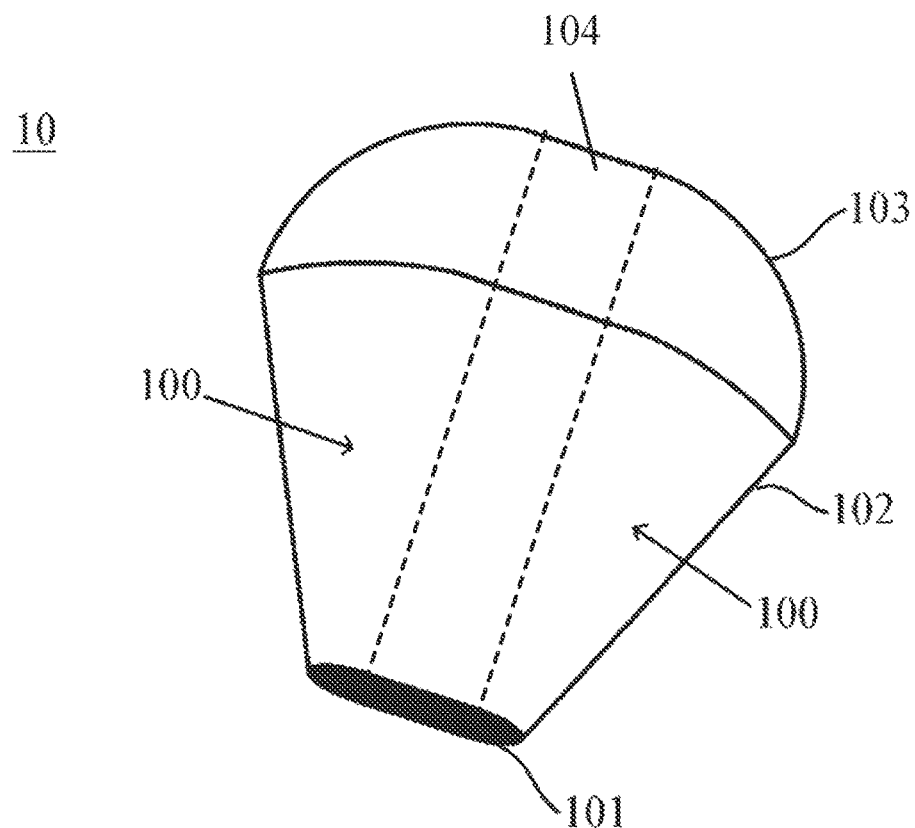
Figure 2A:
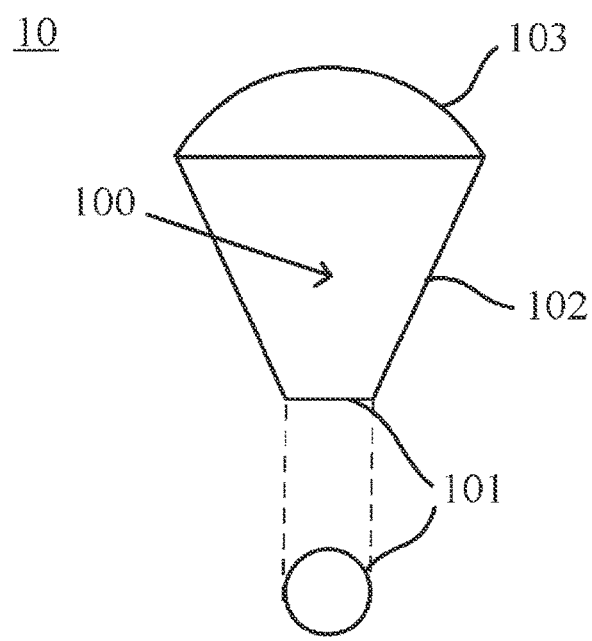
FIGS. 2A to 2C are respective plan views of the three collimating devices in FIGS. 1A to 1C.
Figure 2B:
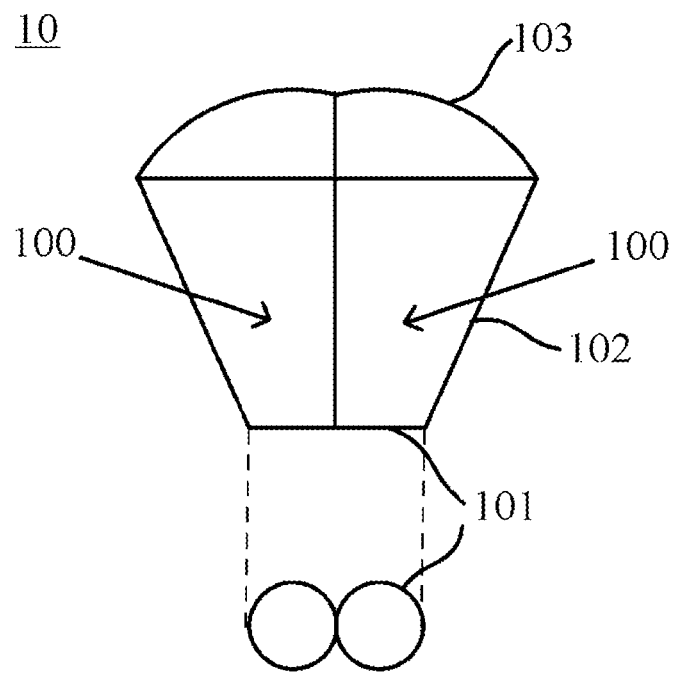
Figure 2C:
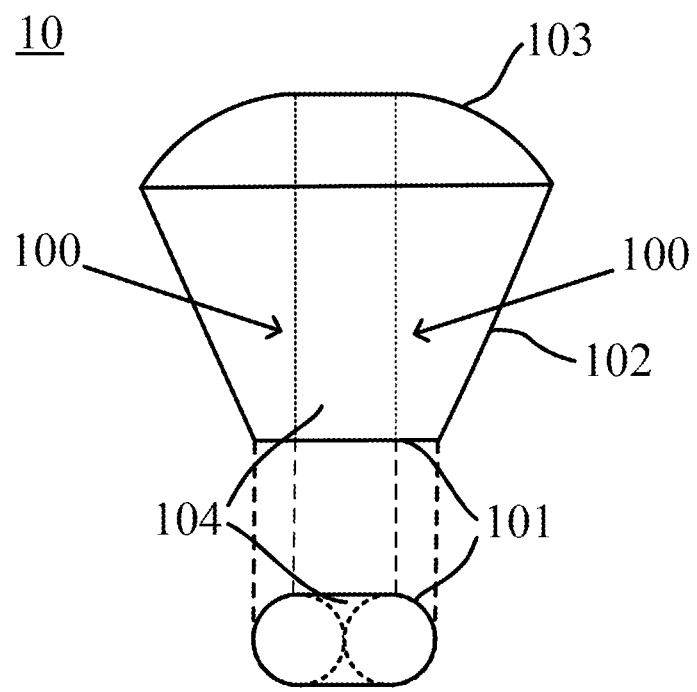

Based on this, some embodiments of the present disclosure provide a collimating device. FIGS. 1A to 1C exemplarily illustrate three-dimensional structural diagrams of the collimating device. FIGS. 2A to 2C are respective plan views of the collimating devices in FIGS. 1A to 1C. Upper portions of FIGS. 2A to 2C are respective cross-sectional views of the collimating devices, and lower portions of FIGS. 2A to 2O are respective schematic diagrams of bottom surfaces of the collimating devices.

As shown in FIGS. 1A to 1C and FIGS. 2A to 2C, the collimating device 10 includes at least one microstructure portion 100. On this basis, as shown in FIGS. 1A and 2A, each microstructure portion 100 includes a bottom surface 101, a side surface 102 connected to the bottom surface, and a top surface 103 opposite to the bottom surface 101 and connected to the side surface 102. The top surface 103 is a convex free-form surface. An angle between the bottom surface 101 and the side surface 102 is an obtuse angle.

Figure 3:
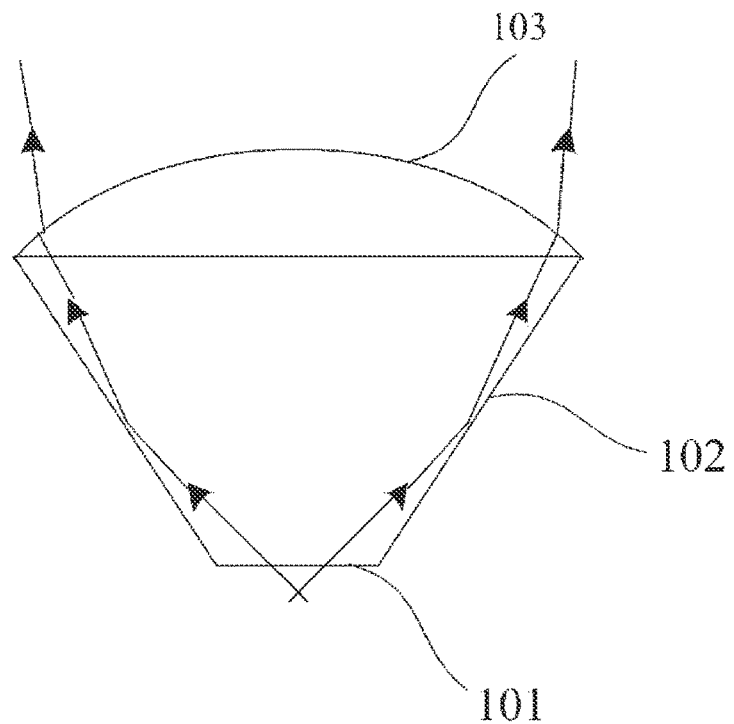
FIG. 3 is a diagram showing a collimation principle of a collimation device, according to some embodiments of the present disclosure.

As shown in FIG. 3, when light rays are incident into the collimating device, first, a total internal reflection occurs on the side surface 102 (that is; the light rays are collimated for a first time); then, the light rays travels to the top surface 103; and the top surface 103 collimates the light rays reflected by the side surface 102 for a second time. Thus, by using the side surface 102 and the top surface 103 to collimate the light rays twice, a near-collimated light beam may be obtained, and a luminance efficiency may be improved.

For example, the microstructure portion 100 has an axis of rotational symmetry 1001 that is perpendicular to the bottom surface 101 thereof. That is, after being rotated by 180° about the axis of rotational symmetry 1001, the microstructure portion 100 can overlap with the microstructure portion 100 before the rotation. With such design, it may be possible to improve a uniformity of emitted light while achieving collimation by use of the microstructure portion 100.

In some embodiments, in order to obtain an ideal microstructure portion, and to simplify and optimize the design of the collimating device, the following method may be used to design the microstructure portion in the embodiments of the present disclosure.

Figure 4:
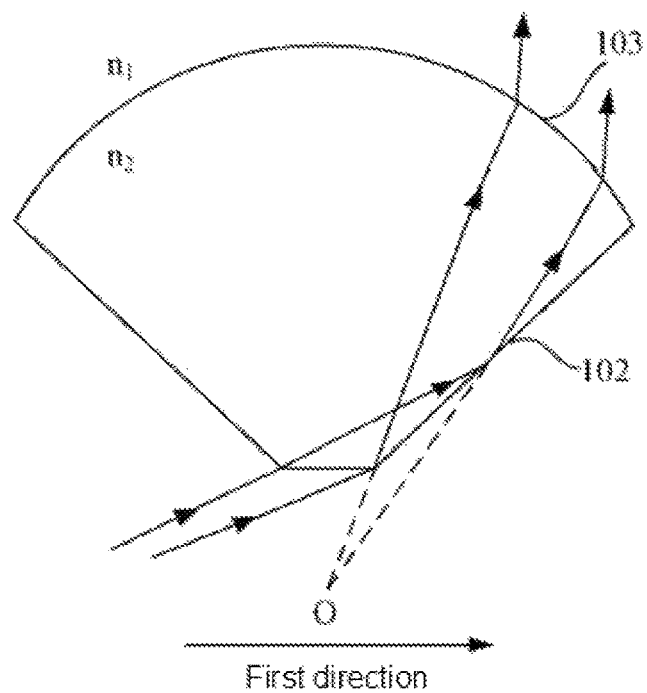
FIG. 4 is a diagram showing a simplified model of an optical path of a collimating device, according to some embodiments of the present disclosure.

First, it is assumed that light travelling along a first direction is unidirectional light, as shown in FIG. 4. According to the law of light transmission path, light reflected by the side surface 102 of the microstructure portion may be considered as being emitted from an imaginary point light source O, and then may travel to the top surface 103, i.e., the convex free-form surface.

Figure 5:
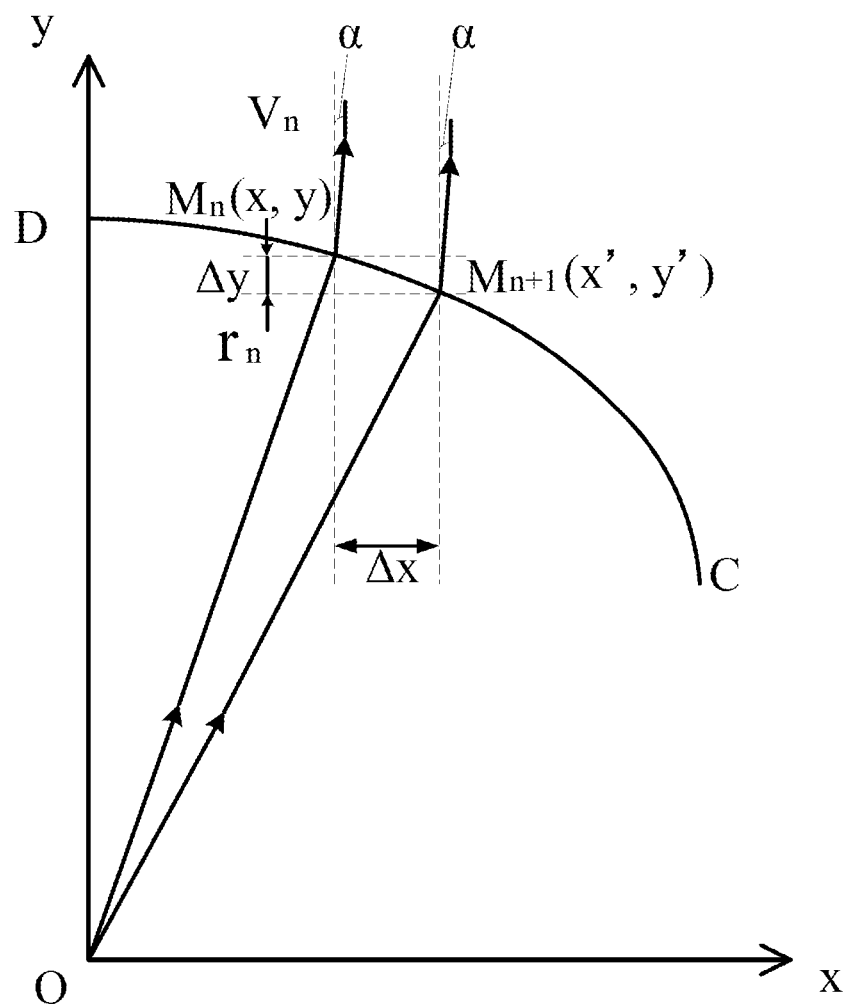
FIG. 5 is a diagram showing a design principle of a collimating device, according to some embodiments of the present disclosure.

A coordinate system as shown in FIG. 5 is established with a position of the point light source O as a coordinate origin. A refractive index of a medium that is in contact with the top surface 103 is $n_1$. A refractive index of the microstructure portion is $n_2$. An angle between a light ray (i.e., a refracted light ray) emitted from the top surface 103 (i.e., the convex free-form surface) and a y-axis direction is α. A unit vector of an incident light ray is $r_n$, and a unit vector of the refracted light ray is $v_n$. DC is a free-form curve (i.e., an intersecting line where the convex free-form surface 103 and a reference plane S perpendicular to the bottom surface 101 of the microstructure portion intersect). $M_n(x,y)$, $M_{n+1}(x',y')$ are two adjacent points on the free-form curve DC. $N_t$ is a unit normal vector of a line connecting the two points.

According to the relationship between light path and vector, it may be obtained that:

$$M_n M_{n+1} = (x' - x, y' - y) = (\Delta x, \Delta y),$$

$$r_n = \left( \frac{x}{\sqrt{x^2 + y^2}}, \frac{y}{\sqrt{x^2 + y^2}} \right),$$

$$v_n = (\sin\alpha, \cos\alpha).$$

According to the law of refraction, it is known that $N_t$ is an unit vector of a difference between vectors of the refracted light ray and the incident light ray, i.e., $$N_t = \frac{(n_1 v_n - n_2 r_n)}{\sqrt{n_1^2 + n_2^2 - 2n_1 n_2 (v_n \cdot r_n)}}.$$

Herein, the vector of the incident light ray is equal to $n_2 \cdot r_n$, and the vector of the refracted light ray is equal to $n_1 \cdot v_n$.

Since $N_t$ and $M_n M_{n+1}$ are perpendicular to each other, $M_n M_{n+1} \cdot N_t = 0$, thus:

$$\Delta y = \frac{n_2 x - n_1 \sin\alpha \sqrt{x^2 + y^2}}{n_1 \cos\alpha \sqrt{x^2 + y^2} - n_2 y} \Delta x.$$

Therefore, in some embodiments, the convex free-form surface may be determined by the above formula.

In this embodiment, it is expected that the refracted light exits vertically, that is, α=0. In this case, $$\Delta y = \frac{n_2 x}{n_1 \sqrt{x^2 + y^2} - n_2 y} \Delta x.$$

According to a relationship between $\Delta x$ and $\Delta y$, the free-form curve DC may be fitted by calculating coordinates using a method of differentiation. A desired free-form surface may be obtained by making the obtained free-form curve DC move according to a certain trajectory (for example, by rotating the free-form curve DC by 360° with the y-axis of the plane coordinate system in FIG. 5 as a rotation axis, a free-form surface may be obtained, which may be used as the top surface 103 of the microstructure portion as described above). It is worth emphasizing that, if the light is required to exit in parallel at a certain angle, a corresponding free-form curve may be obtained by setting a value of α. Therefore, the embodiment of the present disclosure does not limit the value of α.

In addition, in order to ensure that the light is totally reflected by the side surface of the microstructure portion, the angle between the side surface and the bottom surface needs to meet design requirements of total internal reflection.

Figure 6:
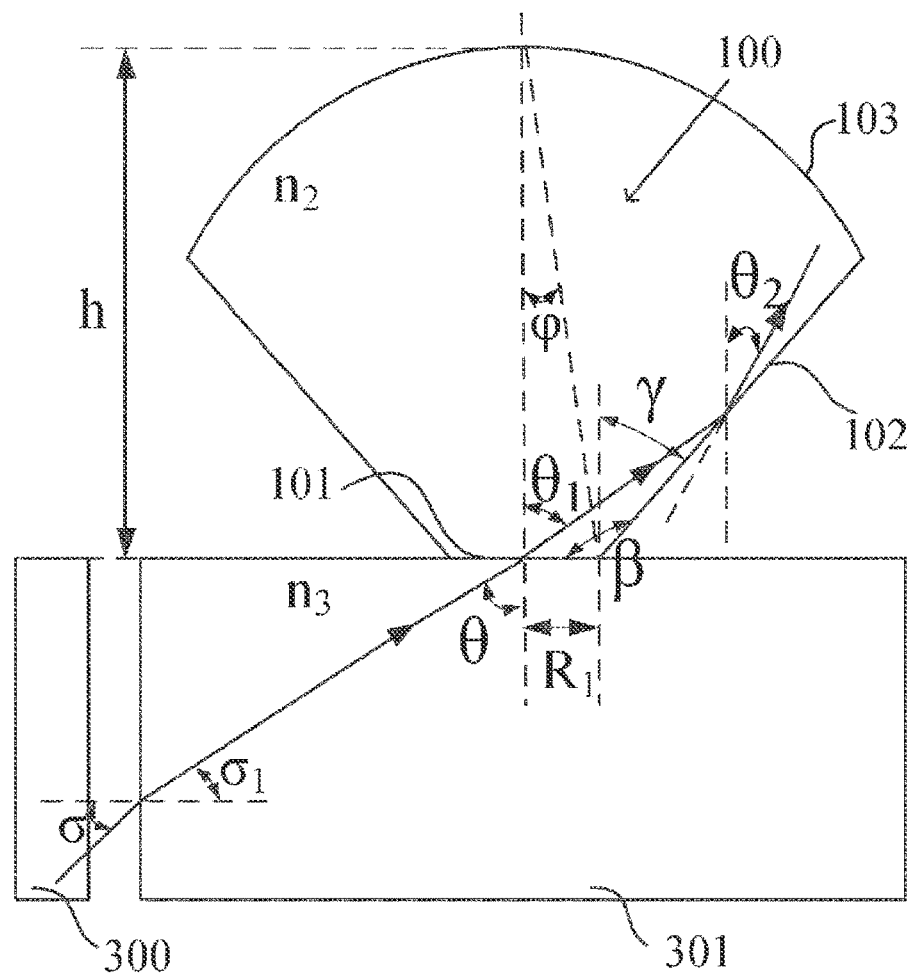
FIG. 6 is a diagram showing an optical path of a backlight module, according to some embodiments of the present disclosure.

The angle between the side surface 102 and the bottom surface 101 of the microstructure portion 100 is derived with reference to FIG. 6. In FIG. 6, the bottom surface 101 is in a shape of a circle, and $R_1$ is a radius of the circle; h is a height of the microstructure portion 100 (i.e., a dimension of the microstructure portion 100 in a direction perpendicular to its bottom surface 101); $n_2$ is the refractive index of the microstructure portion 100; $n_3$ is a refractive index of a medium that is in contact with the bottom surface 101; θ is an incident angle of a light ray incident onto the bottom surface 101, and $θ_1$ is a refraction angle of a light ray in the microstructure portion 100 after passing through the bottom surface 101. After light rays enter the microstructure portion 100 from the bottom surface 101, the refracted light rays are totally reflected by the side surface 102. If an angle between the reflected light ray and a normal direction of the bottom surface 101 is $θ_2$, an angle between the side surface 102 and the normal of the bottom surface 101 is denoted as γ, and the angle between the side surface 102 and the bottom surface 101 is denoted as β, then:

β=90°+γ     (Formula 1).

According to the law of refraction, it may be derived that $$θ_1 = \arcsin\left(\frac{n_3}{n_2}\sinθ\right). \quad \text{(Formula 2)}$$

According to a relationship between the angles in the drawing, it may be derived that $θ_2=2γ-θ_1$     (Formula 3).

It is set that: when $θ_2>0°$, the light rays are located at a right side of the normal; when $θ_2<0°$, the light rays are located at a left side of the normal; when $θ_2=0°$, the light rays are parallel to the normal, i.e., in a vertical direction.

In order to make full use of the microstructure portion 100, and to ensure that the light rays reflected by the side surface 102 do not exceed a center of the microstructure portion 100, with regard to the light rays incident at a maximum incident angle $\theta_{max}$; $\theta_2$ is required to satisfy $\theta_2=-\varphi$. Herein, $$\varphi = \arctan\left(\frac{R_1}{h}\right), \text{ i.e., } \theta_2 = -\arctan\left(\frac{R_1}{h}\right). \quad \text{(Formula 4)}$$

When $\theta=\theta_{max}$, according to Formulas 1 to 4, it may be obtained that;

$$\beta = 90° + \frac{\arcsin\left(\frac{n_3}{n_2}\sin\theta_{max}\right) - \arctan\left(\frac{R_1}{h}\right)}{2}. \quad \text{(Formula 5)}$$

Therefore, in some embodiments, the bottom surface 101 of each microstructure portion 100 is in the shape of a circle, and the angle between the bottom surface 101 and the side surface 102 is determined by Formula 5.

Individual microstructure portions 100 are optimally designed through the simplified model above.

In some other embodiments, referring to FIGS. 1B and 2B, the collimating device 10 includes two microstructure portions 100 that intersect. Axes of rotational symmetry 1001 of the two microstructure portions 100 are substantially parallel to each other. The phrase "substantially parallel" means that the two axes of rotational symmetry may be parallel to each other, or approximately parallel to each other.

For example, by moving the two microstructure portions 100 toward each other in a same plane perpendicular to the axes of rotational symmetry 1001 and making the two microstructure portions 100 intersect, the collimating device 10 shown in FIGS. 1B and 2B may be obtained (that is, the bottom surfaces of the two microstructure portions 100 are located in a same plane, and the two microstructure portions 100 are located at a same side of the plane). A degree of the intersection is not limited herein, and the bottom surfaces 101 of the two microstructure portions 100 may be separated, tangent, or intersecting, as long as the two microstructure portions 100 have overlapping portions. In FIG. 1B, edges of the bottom surfaces 101 of the two microstructure portions 100 are tangent, which is only an exemplary embodiment of the collimating device 10.

In some embodiments, referring to FIGS. 1C and 2C, the collimating device 10 includes two microstructure portions 100 and a filling portion 104 provided between the two microstructure portions 100. The axes of rotational symmetry of the two microstructure portions 100 are substantially parallel to each other. The phrase "substantially parallel" means that the two axes of rotational symmetry may be parallel to each other, or approximately parallel to each other.

For example, by moving the microstructure portion 100 along a straight line for a certain distance in a same plane perpendicular to the axis of rotational symmetry, edges of the microstructure portion 100 may form an envelope in space, and may thus form the collimating device 10 shown in FIGS. 1C and 2C (i.e., the collimating device including the two microstructure portions 100 and the filling portion located between the two microstructure portions 100), The bottom surface 101 of the collimating device 10 is of a shape formed by a linear movement of a circle. A specific distance by which the microstructure portion is moved is not limited here. In FIGS. 1C and 2C, the microstructure portion 100 is moved by a distance that is equal to a diameter of the circle, which is only an exemplary embodiment of the collimating device 10.

It will be noted that the collimating device may be made using polymer materials such as polymethyl methacrylate (PMMA) or polycarbonate (PC) through an injection molding process, or through a nanoimprint process on a glass, etc.

Figure 7:
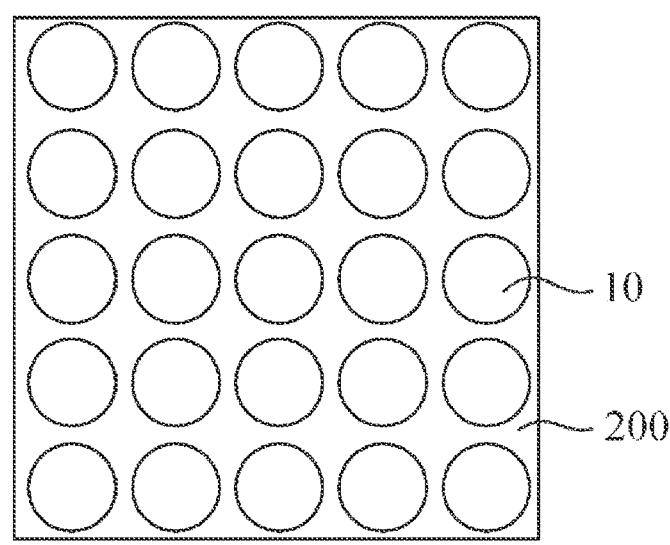
FIG. 7 is a top view of an optical film, according to some embodiments of the present disclosure.
Figure 8:
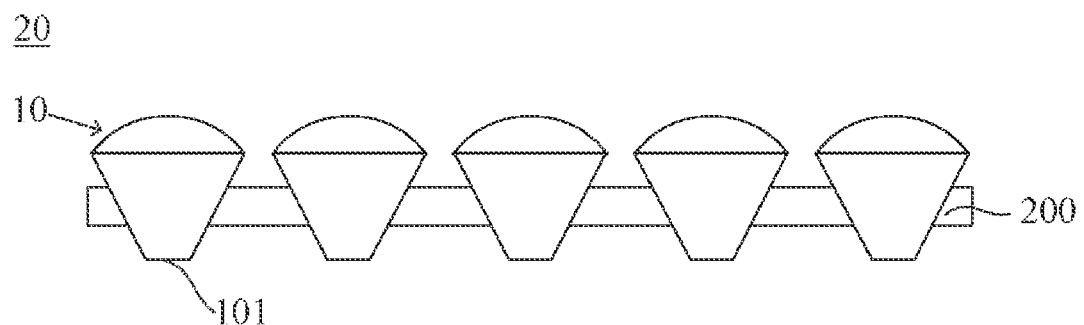
FIG. 8 is a cross-sectional view of an optical film, according to some embodiments of the present disclosure.

On this basis, some embodiments of the present disclosure further provide an optical film 20. FIG. 7 is a top view of the optical film 20. The optical film 20 includes a substrate 200 and a plurality of collimating devices 10 as described above that are arranged in an array in the substrate. As shown in FIG. 8, the bottom surfaces 101 of the microstructure portions are substantially parallel to the substrate 200. In the optical film 20, the substrate 200 supports the plurality of collimating devices 10. The phrase "substantially parallel" means that the bottom surfaces 101 of the microstructure portions may be parallel to the substrate 200, or approximately parallel to the substrate 200.

In this embodiment, the plurality of collimating devices 10 are integrated into a continuous film-like structure, which is convenient for applying them to a surface of a light guide plate or other optical device. When light rays are incident into the collimating device 10 of the optical film 20, a total internal reflection occurs first on the side surface of the collimating device 10, that is, the light rays are collimated for the first time. The light rays then travel to the top surface of the collimating device 10, and the top surface collimates the light rays reflected by the side surface for the second time. Thus, by collimating the light rays twice through the side surface and the top surface of the collimating device 10, a near-collimated light beam may be obtained, and a high luminance efficiency may be provided.

For example, as shown in FIGS. 7 and 8, the optical film 20 is of a single-layer structure, That is, the substrate 200 and the plurality of collimating devices 10 integrated into the substrate 200 constitute a single layer of film. In this way, it may be possible to control optical directions in at least two dimensions through the single layer of film. Therefore, the optical film 20 has advantages of a simple structure and strong control ability.

Figure 9:
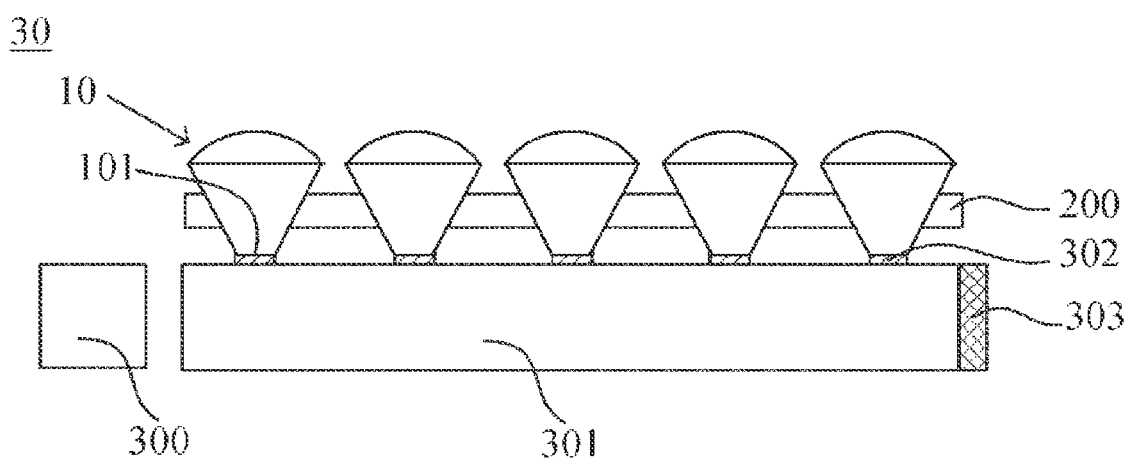
FIG. 9 is a cross-sectional view of a backlight module, according to some embodiments of the present disclosure.
Figure 16:
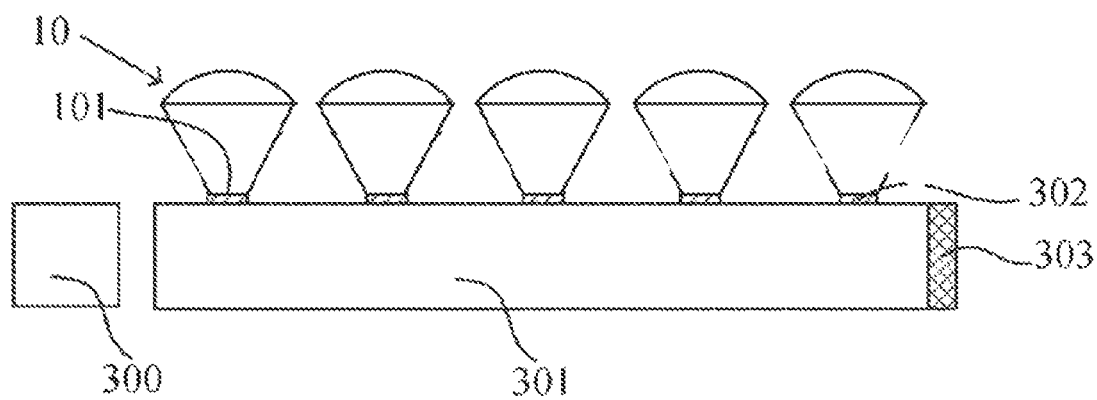
FIG. 16 is a cross-sectional view of another backlight module, according to some embodiments of the present disclosure.

Some embodiments of the present disclosure further provide a backlight module 30. As shown in FIGS. 9 and 16, the backlight module 30 includes a light source 300 and a light guide plate 301. On this basis, the backlight module 30 further includes at least one collimating device 10 as described above, or the optical film as described above.

A light emitting surface of the light source 300 faces a light incident surface of the light guide plate 301. Bottom surface(s) 101 of the collimating device(s) 10 face a light exit surface of the light guide plate 301.

Figure 10:
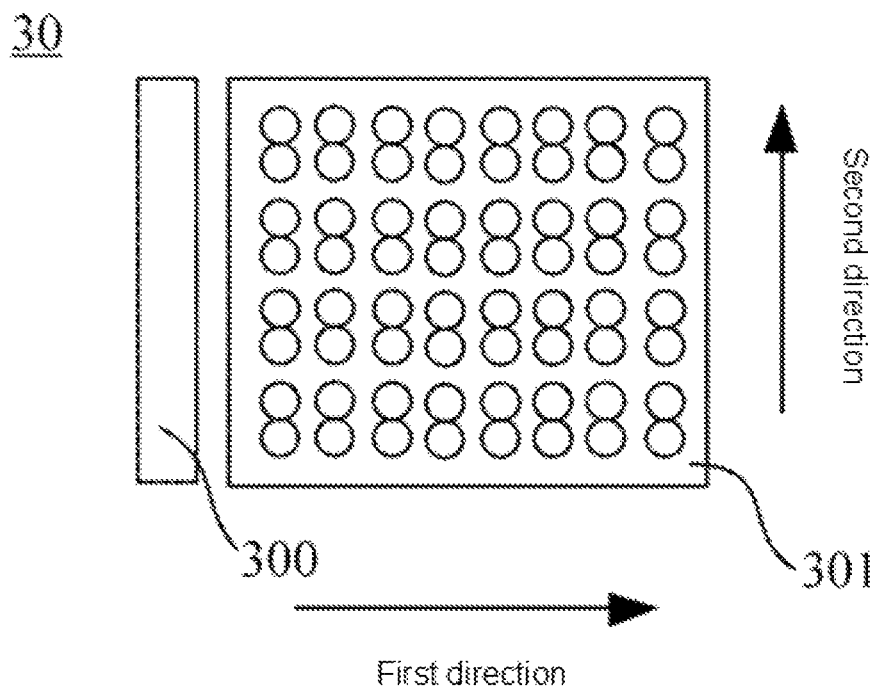
FIG. 10 is a top view of a backlight module, according to an embodiment of the present disclosure.

In a case where the collimating device 10 includes two microstructure portions that intersect, for example, referring to FIG. 10, a line connecting centers of bottom surfaces of the two microstructure portions (i.e., a line extending in a second direction) is substantially parallel to the light incident surface of the light guide plate 301. This arrangement facilitates a collimation of light rays in a direction perpendicular to the light incident surface (i.e., the first direction).

Figure 11:
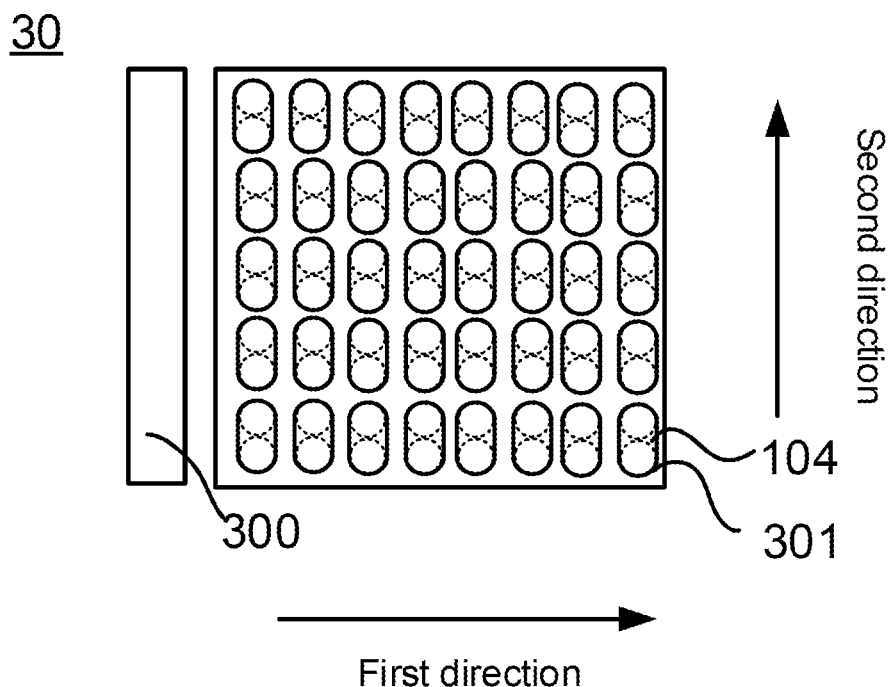
FIG. 11 is a top view of a backlight module, according to another embodiment of the present disclosure.

In a case where the collimating device 10 includes two microstructure portions and a filling portion 104 located between the two microstructure portions, for example, referring to FIG. 11, a line connecting centers of the bottom surfaces of the two microstructure portions (i.e., a line extending in the second direction) is parallel to the light incident surface of the light guide plate 301. This arrangement facilitates the collimation of light rays in a direction perpendicular to the light incident surface (i.e., the first direction).

In some embodiments, a refractive index of the collimating device 10 is substantially same as a refractive index of the light guide plate 301. Here, the phrase "substantially same" means that the refractive index of the collimating device 10 is equal, or approximately equal to the refractive index of the light guide plate 301. In this way, it may be possible to avoid refraction of light rays at an interface between the light guide plate 301 and the collimating device 10. For example, the collimating device and the light guide plate may be made of a same material. For example, the collimating device and the light guide plate are both made of PMMA. That is, in FIG. 6, $n_2=n_3=1.49$. In a case where the top surface is in contact with air, $n_1=1$. According to the law of refraction, an angle of a light ray entering the light guide plate is:

$$\sigma_1 = \arctan\left(\frac{1}{n_3}\sin\sigma\right).$$

In a case where the light source is a Lambertian light source, an exit angle of the Lambertian light source is: $0 \le \sigma \le 180°$. Therefore, in FIG. 6, $0 \le |\sigma_1| \le 42.2°$, i.e., $47.8° < \theta = \theta_1 \le 90°$. Assuming that $R_1=7$ μm and h=55 μm, in a case where $\theta_{max}=90°$, according to Formula 5, it may be calculated that $\beta=131.3°$.

In some embodiments, the bottom surface of each microstructure portion 100 faces the light exit surface of the light guide plate 301. In this way, it may be possible to extract as much light as possible from the light guide plate 301 into the collimating device 10.

A ratio of an area of the bottom surface of the collimating device 10 to an area of the light guide plate 301 occupied by each collimating device 10 is defined as an aperture ratio η. The larger the η is, the more light per unit area of optical film can extract, and the higher the luminance efficiency. Respective aperture ratios of the three exemplary collimating devices shown in FIGS. 1A to 1C in corresponding backlight modules are calculated as follows. Three structures shown in FIGS. 12A to 12C correspond to structures of the three collimating device in FIGS. 1A to 1C, respectively. Assuming that an orthographic projection of the microstructure portion on a plane where the bottom surface thereof is located is a circle, a diameter of the circular orthographic projection is $D_0$, and a minimum distance between adjacent collimating devices is d, then the aperture ratios of the three backlight modules may be obtained according to a geometric relationship, respectively:

$$\eta_a = \frac{\pi R_1^2}{D_1^2},\ \eta_b = \frac{2\pi R_1^2}{D_1 D_2},\ \eta_c = \frac{(4+\pi)R_1^2}{D_1 D_2},$$

where, $D_1=D_0+d$, and $D_2=D_0+d+2R_1$. Since $R_1$ is much less than $D_0$, it may be known that $\eta_c > \eta_b > \eta_a$.

Assuming that $D_0=100$ μm, d=10 μm, and $R_1=10$ μm, a law of variation of the aperture ratios of the three collimating devices may be calculated. In FIG. 13, positions (a), (b) and (c) on a line 1201 are the aperture ratios of the three exemplary collimating devices shown in FIGS. 12A to 12C, respectively. Positions (a), (b), and (c) on a line 1202 are angular brightnesses of the backlight modules including the three exemplary collimating devices shown in FIGS. 12A to 12C at an angle of 0°, respectively. In FIG. 13, an ordinate on a left side represents the aperture ratio, and an ordinate on a right side represents the angular brightness. It can be seen that as the aperture ratio increases, the angular brightness at 0° also increases, and the two are positively correlated. It can be known that by increasing the aperture ratio, the luminance efficiency of the backlight module may be significantly improved.

Figure 12A:
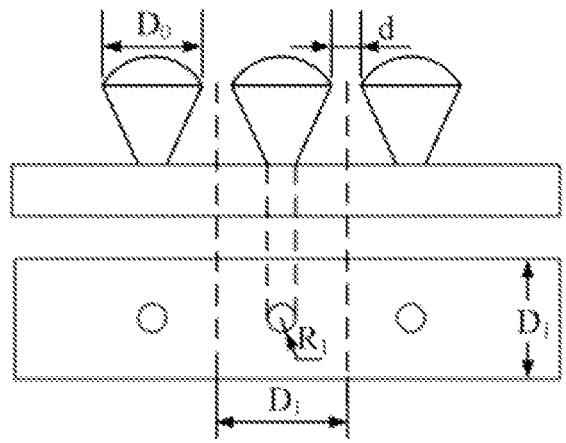
FIGS. 12A to 12C are diagrams showing principles of calculating respective aperture ratios of backlight modules, according to some embodiments of the present disclosure.
Figure 12B:
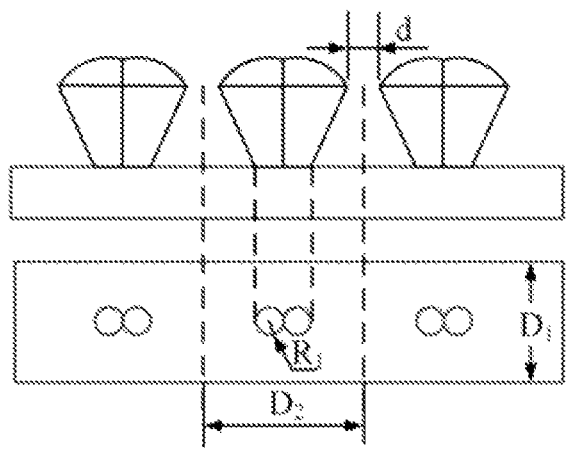
Figure 12C:
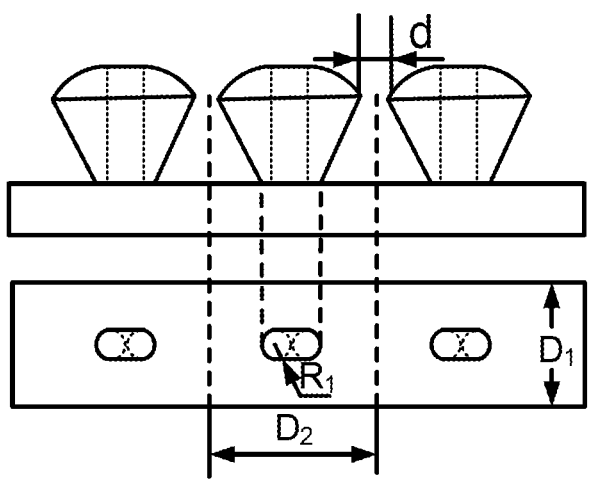
Figure 13:
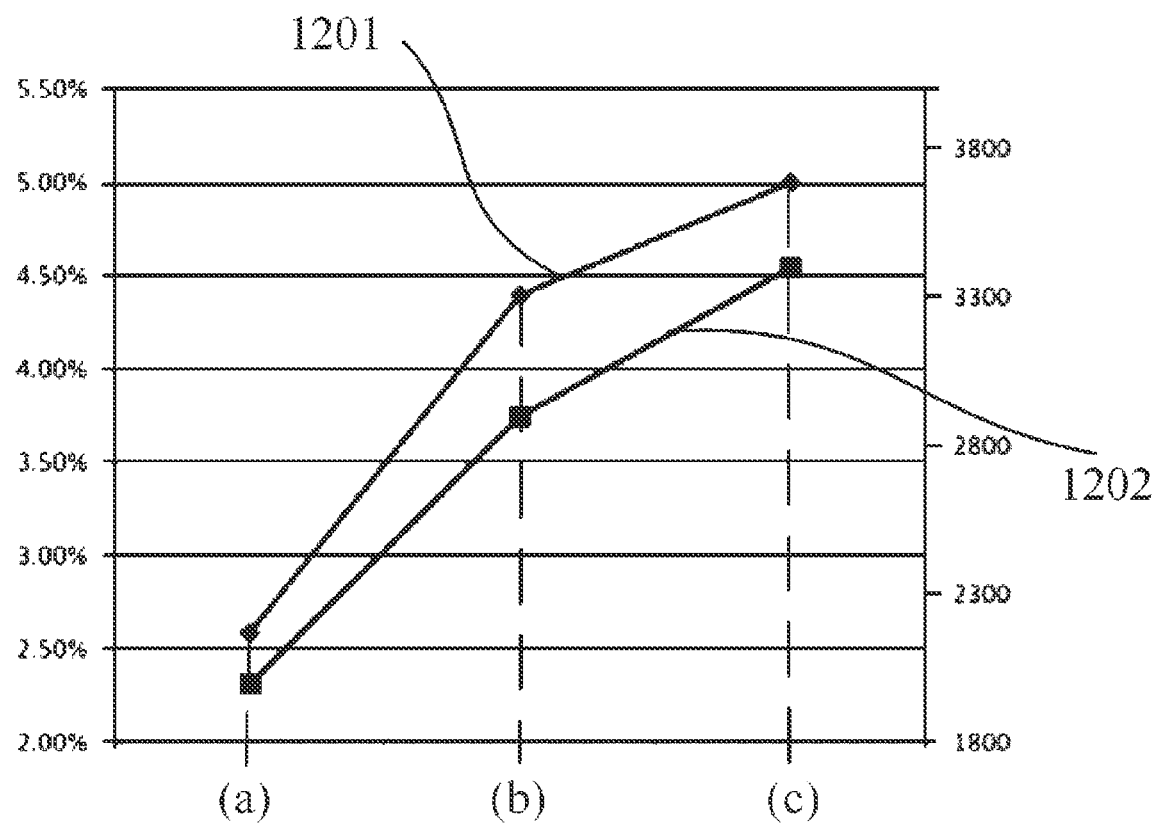
FIG. 13 is a diagram showing a relationship between an aperture ratio and an angular brightness of a backlight module, according to some embodiments of the present disclosure.
Figure 14A:
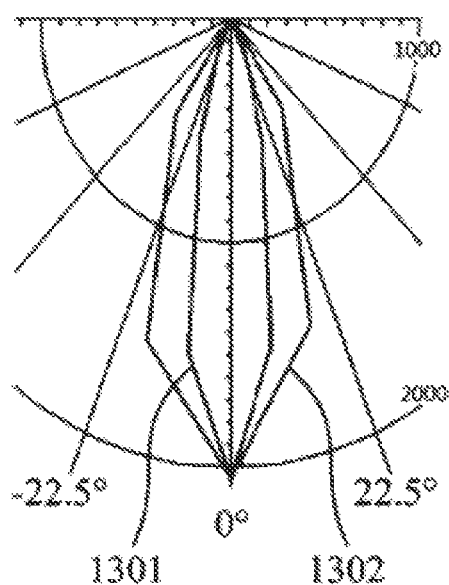
FIG. 14A to 14C are simulation diagrams of angular brightnesses of three backlight modules, according to some embodiments of the present disclosure.
Figure 14B:
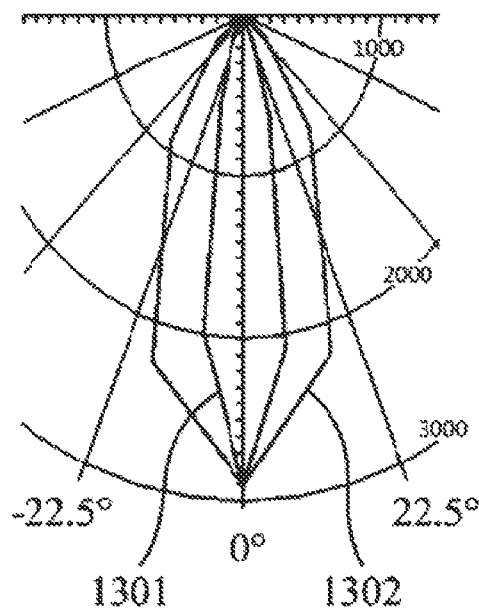
Figure 14C:
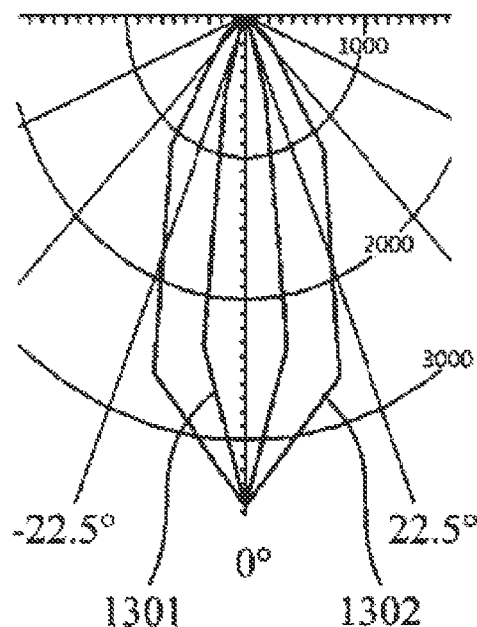

FIGS. 14A to 14C show simulation results of the angular brightnesses of the backlight modules including the three exemplary collimating devices in FIGS. 12A to 12C, respectively, in which lines 1301 represent the angular brightnesses in the first direction, and lines 1302 represent the angular brightnesses in the second direction. The results show that the angular brightnesses of the backlight modules including the three exemplary collimating devices in FIGS. 12A to 12C increase one by one. In a case of 0°, the angular brightness of the backlight module including the collimating device shown in FIG. 12C is increased by 70% compared with the angular brightness of the backlight module including the collimating device shown in FIG. 12A. Although a cut-off angle of the backlight module including the collimating device shown in FIG. 12C in the second direction is increased by 5° compared with a cut-off angle of the backlight module including the collimating device shown in FIG. 12A in the second direction, a collimation effect of the backlight module including the collimating device shown in FIG. 12C in the first direction is significantly better than a collimation effect of the backlight module including the collimating device shown in FIG. 12A in the first direction. In a case where the embodiments of the present disclosure are applied to a backlight module in which the light source is located on a single side of the light guide plate, a divergence of light rays in the first direction is more serious. That is, more attention is paid to the collimation effect in the first direction. Therefore, in a case where the cut-off angle in the second direction does not change much, the backlight module including the collimating device shown in FIG. 12C may be able to provide an ideal collimation effect.

Those skilled in the art will understand that as the number of microstructure portions constituting the collimating device increases, the aperture ratio increases. This embodiment does not limit the number of the microstructure portions constituting the collimating device. As for a collimating device composed of three or more microstructure portions, when the backlight module is formed, the line connecting the centers of the bottom surfaces of the microstructure portions may also be arranged to be parallel to the light incident surface of the light guide plate. This arrangement facilitates the collimation of light rays in the direction perpendicular to the light incident surface (i.e., the first direction).

In some embodiments, as shown in FIG. 9, the backlight module 30 further includes glue layer(s) 302 located between the collimating device(s) 10 and the light exit surface of the light guide plate 301. A refractive index of the glue layer 302 is substantially same as the refractive index of the light guide plate 301. Herein, the phrase "substantially same" means that the refractive index of the glue layer 302 is equal, or approximately equal to the refractive index of the light guide plate 301. By providing the glue layer 302, it may be possible to extract as much light as possible into the collimating device 10 and increase a connection strength between the collimating device 10 and the light guide plate 301.

In some embodiments, as shown in FIG. 9, the backlight module 30 further includes a reflective layer 303. The reflective layer 303 is located on a surface of the light guide plate 301 opposite to the light incident surface. By providing the reflective layer 303, it may be possible to reflect light rays that may have escaped from the surface of the light guide plate 301 opposite to the light incident surface back into the light guide plate 301, thereby further reducing a loss of light and improving the luminance efficiency.

In the backlight module, when light rays emitted from the light source are incident into the collimating device through the light guide plate, first, a total internal reflection occurs on the side surface of the microstructure portion (that is, the light rays are collimated for the first time). Then, the light rays travels to the top surface of the microstructure portion, and the top surface collimates the light rays reflected by the side surface for the second time. Thus, by using the side surface and the top surface to collimate the light rays twice, a near-collimated light beam may be obtained, and a high luminance efficiency may be provided.

Figure 15:
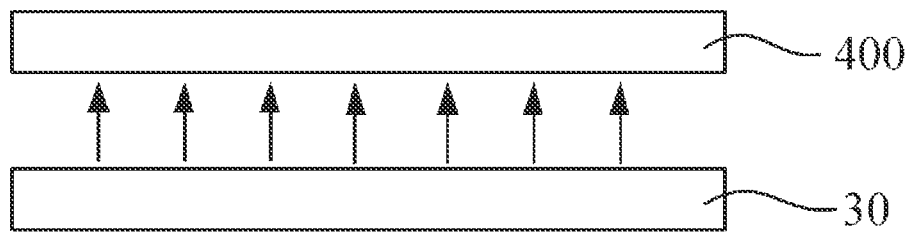
FIG. 15 is a structural diagram of a display apparatus, according to some embodiments of the present disclosure.

Some embodiments of the present disclosure further provide a display apparatus 40. As shown in FIG. 15, the display apparatus 40 includes the backlight module 30 as described above and a liquid crystal display panel 400. The liquid crystal display panel 400 is located at a light exit side of the backlight module 30. The display apparatus 40 has the same advantages as the collimating device, the optical film, and the backlight module as described above, which will not be repeated here.

The display apparatus 40 may be any product or component having a display function, such as an AR helmet, AR glasses, a mobile phone, a tablet computer, a television, a display, a notebook computer, a digital photo frame, or a navigator.

It will be understood that, the above embodiments are merely exemplary embodiments employed to explain the principles of the present disclosure, but the present disclosure is not limited thereto. Various modifications and improvements can be made by a person of ordinary skill in the art without departing from the spirit and scope of the present disclosure, and such modifications and improvements are also within the scope of the present disclosure.

What is claimed is:

1. A collimating device, comprising at least one microstructure portion, each microstructure portion including:
   a bottom surface;
   a side surface connected to the bottom surface, an angle between the side surface and the bottom surface being an obtuse angle; and
   a top surface opposite to the bottom surface and connected to the side surface, the top surface being a convex free-form surface; wherein
   the convex free-form surface satisfies the following formula:

$$\Delta y = \frac{n_2 x - n_1 \sin\alpha \sqrt{x^2 + y^2}}{n_1 \cos\alpha \sqrt{x^2 + y^2} - n_2 y} \Delta x,$$

wherein (x, y) are coordinates of a point on a free-form curve, the free-form curve being an intersecting line of the convex free-form surface and a reference plane that is perpendicular to the bottom surface; $n_1$ is a refractive index of a medium that is in contact with the top surface; $n_2$ is a refractive index of the microstructure portion; $\alpha$ is an angle between light rays emitted from the convex free-form surface and a y-axis, the y-axis being perpendicular to the bottom surface; $\Delta x$ is a variation of two adjacent points on the free-form curve in an x-axis direction, and $\Delta y$ is a variation of the two adjacent points in a y-axis direction.

2. The collimating device according to claim 1, wherein the bottom surface of each microstructure portion is in a shape of a circle; the angle between the bottom surface and the side surface is $\beta$, and $\beta$ satisfies following formula:

$$\beta = 90° + \frac{\arcsin\left(\frac{n_3}{n_2}\sin\theta_{max}\right) - \arctan\left(\frac{R_1}{h}\right)}{2},$$

wherein $\theta_{max}$ is a maximum value of an incident angle $\theta$ of light rays incident onto the bottom surface; $R_1$ is a radius of the circle; h is a height of the microstructure portion in a direction perpendicular to the bottom surface; $n_2$ is a refractive index of the microstructure portion, and $n_3$ is a refractive index of a medium that is in contact with the bottom surface.

3. The collimating device according to claim 1, wherein each microstructure portion has an axis of rotational symmetry that is substantially perpendicular to the bottom surface.

4. The collimating device according to claim 3, wherein the at least one microstructure portion includes two microstructure portions that intersect; and axes of rotational symmetry of the two microstructure portions are substantially parallel to each other.

5. The collimating device according to claim 4, wherein bottom surfaces of the two microstructure portions are located in a same plane, and the two microstructure portions are located at a same side of the plane.

6. The collimating device according to claim 4, wherein edges of the bottom surfaces of the two microstructure portions are tangent.

7. The collimating device according to claim 3, wherein the at least one microstructure portion includes two microstructure portions, and the collimating device further comprises:
   a filling portion provided between the two microstructure portions.

8. An optical film, comprising:
   a substrate; and
   a plurality of collimating devices according to claim 1 that are arranged in an array in the substrate, wherein bottom surfaces of microstructure portions of the collimating devices are substantially parallel to a surface of the substrate proximate to the bottom surfaces of the microstructure portions of the collimating devices.

9. The optical film according to claim 8, wherein the optical film is of a single-layer structure.

10. A backlight module, comprising:
    a light source;
    a light guide plate, a light incident surface of the light guide plate facing a light emitting surface of the light source; and
    the optical film according to claim 8, wherein
    the bottom surfaces of the microstructure portions of the collimating devices face a light exit surface of the light guide plate.

11. The backlight module according to claim 10, wherein each collimating device includes two microstructure portions that intersect, and a line connecting centers of bottom surfaces of the two microstructure portions is substantially parallel to the light incident surface of the light guide plate.

12. The backlight module according to claim 10, further comprising:
glue layers located between the collimating devices and the light exit surface of the light guide plate, a refractive index of the glue layers being substantially same as the refractive index of the light guide plate.

13. A display apparatus, comprising:
the backlight module according to claim 10; and
a liquid crystal display panel located at a light exit side of the backlight module.

14. A backlight module, comprising:
a light source;
a light guide plate, a light incident surface of the light guide plate facing a light emitting surface of the light source; and
at least one collimating device according to claim 1, wherein
a bottom surface of each microstructure portion of each collimating device faces a light exit surface of the light guide plate.

15. The backlight module according to claim 14, wherein the collimating device includes two microstructure portions that intersect, and a line connecting centers of bottom surfaces of the two microstructure portions is substantially parallel to the light incident surface of the light guide plate.

16. The backlight module according to claim 14, wherein a refractive index of the collimating device is substantially same as a refractive index of the light guide plate.

17. The backlight module according to claim 14, further comprising:
at least one glue layer each located between a corresponding collimating device and the light exit surface of the light guide plate, a refractive index of the glue layer being substantially same as the refractive index of the light guide plate.

18. The backlight module according to claim 14, further comprising:
a reflective layer located on a surface of the light guide plate opposite to the light incident surface.

19. A display apparatus, comprising:
the backlight module according to claim 14; and
a liquid crystal display panel located at a light exit side of the backlight module.

* * * * *